Patented June 23, 1942

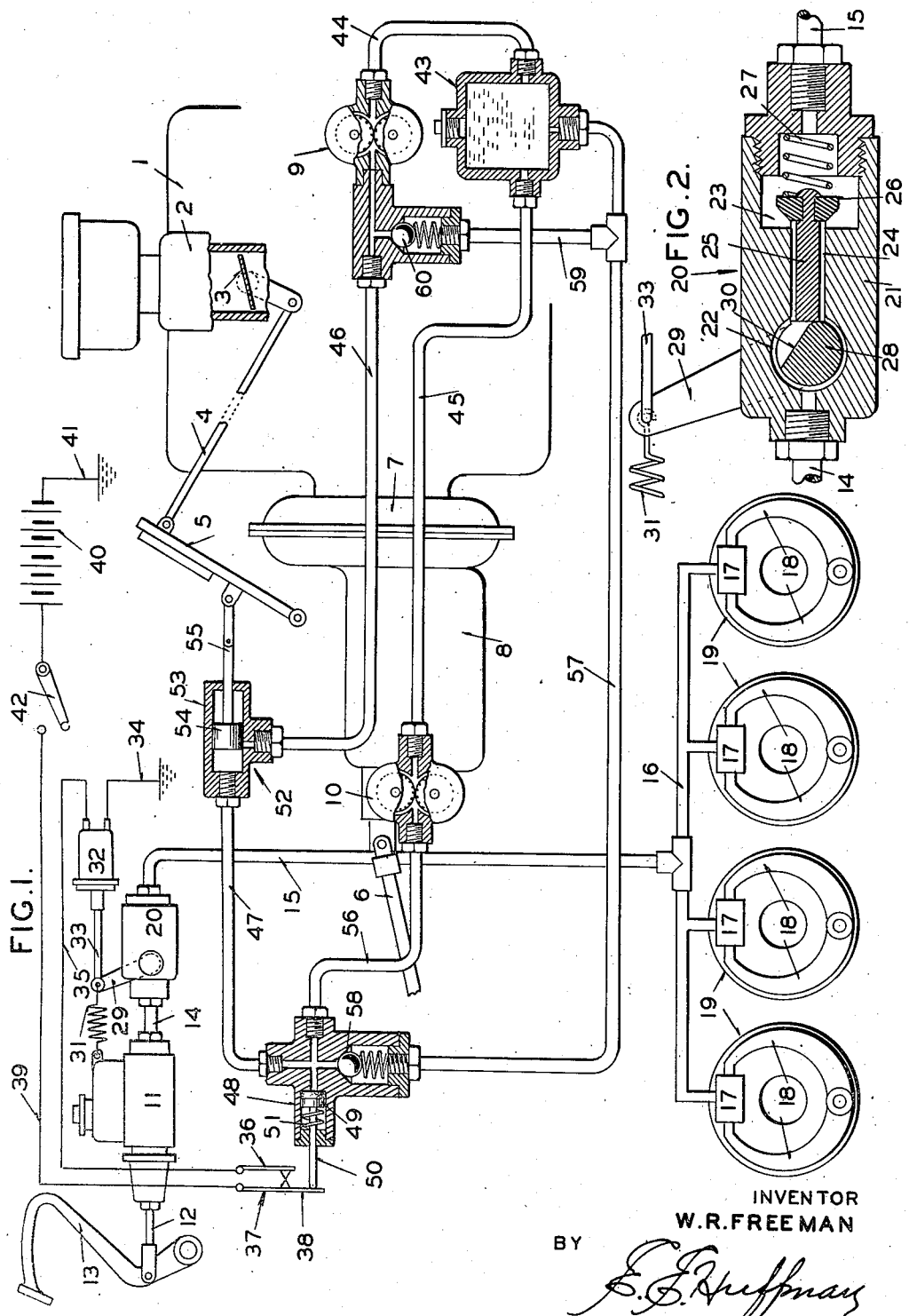

2,287,301

UNITED STATES PATENT OFFICE 2,287,301

BRAKE CONTROL MECHANISM

Walter R. Freeman, Clayton, Mo., assignor to Wagner Electric Corporation, St. Louis, Mo., a corporation of Delaware Application May 24, 1941, Serial No. 394,969

13 Claims. (Cl. 192—3)

My invention relates to brakes and more particularly to the controlling of the actuating means therefor so as to maintain the brakes applied under certain conditions.

One of the objects of my invention is to provide control means for a brake actuating mechanism which can be so associated with a hydraulic pump system that the brakes may be held in applied condition without operator effort only when the vehicle is brought to a stop.

Another object of my invention is to provide improved holding means for a brake actuating system which can be controlled in such a manner by a hydraulic pressure system including pumps driven by the engine and by the propeller shaft of a vehicle that the brakes can be held applied when the vehicle is brought to a stop and automatically released when the vehicle is started and then prevented from being held applied as long as the vehicle is moving.

Other objects of my invention will become apparent from the following description taken in connection with the accompanying drawing in which Figure 1 is a schematic view of a braking system having associated therewith control means embodying my invention, parts being shown in section; and Figure 2 is a sectional view of the holding valve in the hydraulic brake conduit.

Referring to the drawing in detail, I have illustrated an improved brake control means embodying my invention as being associated with a vehicle provided with an automatic change speed transmission including a fluid coupling, said transmission and coupling being commonly known as a "Hydromatic" transmission. This transmission embodies as a part of its automatic gear shifting means two hydraulic systems including separate hydraulic pumps, one of which is driven by the engine and the other of which is driven by the propeller shaft. These pumps in the particular embodiment shown are employed as part of my improved control means for the brake holding means and in the drawing the manner in which said pumps are connected to control the special transmission is not illustrated as such does not in any way concern the operation of the brake control means. It is to be understood, however, that although the pumps shown are intended to be a part of the automatic change speed transmission, separate pumps may be employed if desired without in any way changing the operation of the control means for the brakes.

As shown in the drawing, numeral 1 indicates an engine of a vehicle having a carburetor 2, including a butterfly valve 3, for controlling the amount of engine fuel. The butterfly valve is connected by a rod 4 to the usual accelerator pedal 5 mounted in the operator's compartment of the vehicle. The engine 1 is connected to the propeller shaft 6 of the vehicle by means of the fluid coupling 7 and the automatic transmission 8, said propeller shaft driving the wheels of the vehicle in the usual manner by being connected through differential gearing not shown. The engine drives the gear pump 9 and the propeller shaft drives the gear pump 10, these pumps generating hydraulic pressure for controlling the automatic changing of the speed ratios of the transmission 8.

The braking system for the vehicle wheels is of the hydraulically-actuated type and comprises a master cylinder 11 having a piston connected by a rod 12 to the brake pedal 13. Conduits 14 and 15 and branch conduits 16 connect the master cylinder with the fluid motors 17 for actuating the brake shoes 18 of the brake assemblies 19.

Interposed between conduits 14 and 15 is a brake holding valve 20 (shown in section in Figure 2) having a casing 21 provided with two chambers 22 and 23 interconnected by a passage 24. Chamber 22 is connected with conduit 14 leading to the master cylinder and chamber 23 is connected to conduit 15 leading to the brake actuating fluid motors. Positioned in passage 24 is a fluted valve stem 25 carrying at one end a valve element 26 lying in chamber 23 and cooperating with the end of passage 24 for closing said passage. Said valve element is normally biased toward a closed position by a spring 27. A cross-shaft 28 is journaled in the housing in order to extend into chamber 22 and the outer end of said shaft carries an actuating arm 29. The portion of the shaft within the chamber is provided with a cam 30 for cooperation with the end of the valve stem 24 to thus cause the valve element 26 to be unseated when desired. A fairly strong spring 31 is connected to arm 29 and normally biases the shaft to a position where the valve element is unseated against the seating spring 27.

The valve element is permitted to be seated by the functioning of a solenoid 32, the plunger of which is connected by a rod 33 to arm 29. When the solenoid is energized, arm 29 will be rotated against the pull of spring 31 to a position where cam 30 will permit the valve element 26 to be seated by spring 27. With the valve element seated, any fluid under pressure being developed in the fluid motors to hold the will be trapped in the fluid motors to hold the brakes applied. If the brakes have not been applied when the valve element 26 is permitted to be seated, they may be applied by operating the master cylinder since fluid under pressure is always permitted by the valve element 26 to flow to the brake actuating fluid motors.

One end of the winding of the solenoid is connected to ground by a conductor 34 and the other end of said winding is connected by a conductor 35 to a fixed contact 36 of a switch 37. The yieldable contact 38 of this switch is connected by a conductor 39 to one terminal of a battery 40, the other terminal of said battery being connected to ground by a conductor 41. The conductor 39 may have associated therewith a manual switch 42 which is preferably the ignition switch of the vehicle.

Associated with the two gear pumps 9 and 10 is a sump 43, the inlet to pump 9 being connected thereto by a conduit 44 and the inlet to pump 10 being connected thereto by a conduit 45. The outlet or pressure side of the gear pump 9 is connected by conduits 46 and 47 to a cylinder 48 positioned adjacent switch 37. Within the cylinder is a piston 49 provided with a stem 50 for engaging the contact 38 of switch 37, said piston being normally biased by a spring 51 to a position where the stem will permit the yieldable contact 38 of switch 37 to engage contact 36. Interposed between conduits 46 and 47 and positioned adjacent the accelerator pedal is a shut-off valve 52 comprising a cylindrical casing 53 and a piston 54, said piston being connected to the accelerator pedal by the rod 55. The piston is so arranged that when the accelerator pedal is in released position, said piston will cut off communication between conduits 46 and 47 and when the accelerator is depressed, said piston will assume a position permitting communication between said conduits.

The outlet or pressure side of the gear pump 10 is also connected to communicate with cylinder 48 by means of a conduit 56 so that fluid pressure generated by pump 10 can also be effective in moving piston 49 and opening switch 37.

In order to permit fluid to flow back to the sump when the pressure in the cylinder 48 becomes excessive, said cylinder is connected to the pump by a conduit 57 and associated with this conduit is a pressure relief valve 58. There is also provided a conduit 59 and a pressure relief valve 60 for permitting flow of fluid to the sump from pump 9 when the pressure developed thereby becomes excessive due to the shut-off valve 52 being closed.

Referring to the operation of the described control means, when the vehicle is stopped and the accelerator pedal is in released position, there will be no fluid pressure in cylinder 48 and, therefore, piston 49 will be biased by spring 51 to a position where switch 37 is closed. Fluid pressure will not be present in cylinder 48 due to the fact that the shut-off valve 52 is closed (accelerator pedal released) and pump 10 is not operating because the propeller shaft is not rotating. Any residue pressure which might be in cylinder 48 is relieved by leakage of the gears of pump 10. With switch 37 in closed position solenoid 32 will be energized to rotate shaft 28 of the holding valve to a position where cam 30 will permit valve element 26 to be seated under the action of its spring 27.

If the brakes are in applied condition when valve element 26 becomes seated, the brakes will be held applied since fluid pressure will be trapped in the brake actuating motors. If the brakes are not applied at the time the valve is closed, they may be applied and held applied. With the brakes held applied, the foot of the operator may be removed from the brake pedal and employed for other purposes without any danger of the vehicle rolling if it is on an inclined roadway or "creeping" due to the torque transmitted by the fluid coupling. When the vehicle is started, the accelerator pedal is depressed to speed up the engine. This will cause the shut-off valve 50 to be opened and the fluid pressure developed by pump 9, which is continuously driven by the engine, will then be effective in cylinder 48 to move piston 49 to a position where it will open switch 37. The opening of the switch will de-energize the solenoid and permit the holding valve to be released under the action of spring 31. This will release the brakes, such release being almost simultaneous with the depressing of the accelerator pedal. Once the vehicle has started, pump 10 will again be driven by the propeller shaft and fluid pressure developed by it will become effective in cylinder 48 to maintain piston 49 in the position where switch 37 is open. Thus, with pump 10 operating, the maintaining of the switch open will no longer be dependent upon fluid pressure generated by the engine driven pump 9. Thus, regardless of the condition of the shut-off valve the solenoid for the brake holding valve will never become deenergized as long as the vehicle is moving. The depressing and releasing of the accelerator pedal will, therefore, have no effect on the brake holding valve.

When the vehicle is again brought to a stop and the accelerator pedal is permitted to assume released position, the switch 37 will become closed in the manner already described to cause energization of the solenoid and closing of the brake holding valve.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a vehicle provided with a propelling engine, with a torque transmitting connection between the engine and the wheels and with a braking system, means associated with the braking system for holding the brakes applied after being applied by the usual control means, a fluid pressure system including a fluid pressure generator driven by the engine, a second fluid pressure system including a fluid pressure generator driven by an element of the torque transmitting connection which is operable only when the vehicle is moving, means controlled by the fluid pressure developed by either generator for causing the holding means to be inoperative, and means for preventing the fluid pressure developed by the engine driven generator from being effective to cause the brake holding means to be inoperative when the vehicle is in stopped condition.

2. In apparatus of the class described, a vehicle provided with a propelling engine, with a torque transmitting connection between the engine and the wheels and with a braking system, means associated with the braking system for holding the brakes applied after being applied by the usual control means, a fluid pressure system including a fluid pressure generator driven by the engine, a second fluid pressure system including a fluid pressure generator driven by an element of the torque transmitting connection which is operable only when the vehicle is moving, means controlled by the fluid pressure developed by either generator for causing the holding means to be inoperative, and means controlled by a control element of the vehicle for causing the fluid pressure developed by the engine driven generator to be either effective or ineffective in controlling the holding means so that it will be inoperative.

3. In apparatus of the class described, a vehicle provided with a propelling engine, with a torque transmitting connection between the engine and the wheels and with a braking system including an actuating member and a brake operating device controlled thereby, means associated with the braking system for holding the brakes applied after being applied by the actuating member, a hydraulic pressure system including a pump driven by the engine, a second hydraulic pressure system including a pump driven by an element of the torque transmitting connection which is operable only when the vehicle is moving, means controlled by the hydraulic pressure developed by either pump for causing the holding means to be inoperative, and manually-operated means for preventing at will hydraulic pressure developed by the second pump from being effective in causing the holding means to be inoperative.

4. In apparatus of the class described, a vehicle provided with a propelling engine having an accelerator mechanism, with a torque transmitting connection between the engine and the wheels and with a braking system including an actuating member and a brake operating device controlled thereby, means associated with the braking system for holding the brakes applied after being applied by the actuating member, a hydraulic pressure system including a pump driven by the engine, a second hydraulic pressure system including a pump driven by an element of the torque transmitting connection which is operable only when the vehicle is moving, means controlled by the hydraulic pressure developed by either pump for causing the holding means to be inoperative, and valve means controlled by the accelerator mechanism and preventing hydraulic pressure developed by the engine driven pump from being effective in causing the holding means to be inoperative when said accelerator mechanism is in released position.

5. In apparatus of the class described, a vehicle provided with a propelling engine, with a torque transmitting connection between the engine and the wheels and with a braking system comprising a source of fluid pressure, a brake actuating fluid motor and conduit means therebetween, valve means associated with the conduit means for holding the brakes applied, a fluid pressure system separate from the brake system and including a fluid pressure generator driven by the engine, a second fluid pressure system also separate from the brake system and including a fluid pressure generator driven by an element of the torque transmitting connection which is operable only when the vehicle is moving, means for closing said holding valve means, means controlled by fluid pressure developed by either generator for causing the holding valve means to be held open, and means controlled by a control element of the vehicle for causing the fluid pressure developed by the engine driven generator to be ineffective in causing the holding valve means to be held open.

6. In apparatus of the class described, a vehicle provided with a propelling engine having an accelerator mechanism, with a torque transmitting connection between the engine and the wheels and with a braking system comprising a source of fluid pressure, a brake actuating fluid motor and conduit means therebetween, valve means associated with the braking system for holding the brakes applied, a fluid pressure system separate from the brake system and including a fluid pressure generator driven by the engine, a second fluid pressure system also separate from the brake system and including a fluid pressure generator driven by an element of the torque transmitting connection which is operable only when the vehicle is moving, means for closing said holding valve means, means controlled by the fluid pressure developed by either generator for causing the holding valve means to be held open, and means comprising a shut-off valve controlled by the accelerator mechanism for preventing the fluid pressure developed by the engine driven generator from being effective to cause the holding valve means to be held open.

7. In apparatus of the class described, a vehicle provided with a propelling engine, with a torque transmitting connection between the engine and the wheels and with a braking system, means associated with the braking system for holding the brakes applied after being applied by the usual control means, means comprising a solenoid for controlling the operativeness and inoperativeness of the holding means, an electrical circuit for the solenoid including a switch, a fluid pressure system including fluid pressure generator driven by the engine, a second fluid pressure system including a fluid pressure generator driven by an element of the torque transmitting connection which is operable only when the vehicle is moving, a fluid motor for controlling the switch, means for operating the fluid motor to open said switch by fluid pressure developed by either generator, and means for preventing the fluid pressure developed by the engine driven generator from being effective in the fluid motor.

8. In apparatus of the class described, a vehicle provided with a propelling engine having an accelerator mechanism, with a torque transmitting connection between the engine and the wheels and with a braking system, means associated with the braking system for holding the brakes applied after being applied by the usual control means, means comprising a solenoid for controlling the operativeness and inoperativeness of the holding means, an electrical circuit for the solenoid including a switch, a fluid pressure system including a fluid pressure generator driven by the engine, a second fluid pressure system including a fluid pressure generator driven by an element of the torque transmitting connection which is operable only when the vehicle is moving, a fluid motor for controlling the switch, means for operating the fluid motor to open said switch by fluid pressure developed by either generator, and valve means so controlled by the accelerator mechanism as to prevent fluid pressure developed by the engine driven generator from being effective in the fluid motor only when said accelerator mechanism is in released position.

9. In apparatus of the class described, a vehicle provided with a propelling engine, with a torque transmitting connection between the engine and the wheels and with a braking system, means associated with the conduit means for holding the brakes applied after being applied by the usual brake control means, means comprising a fluid motor for controlling said holding means, a fluid pressure developing pump driven by the engine, a second fluid pressure developing pump driven by an element of the torque transmitting connection which is operable only when the vehicle is moving, conduit means for connecting the pumps to the last named fluid motor whereby said fluid motor can be operated by fluid pressure developed by either pump and the holding means caused to be inoperative, and means for preventing the fluid pressure developed by the engine driven pump from being effective in the second named fluid motor.

10. In apparatus of the class described, a vehicle provided with a propelling engine having an accelerator mechanism, with a torque transmitting connection between the engine and the wheels and with a braking system including a source of fluid pressure, a brake actuating fluid motor and conduit means between said source and motor, valve means associated with the conduit means for holding the brakes applied, means comprising a fluid motor for controlling said valve means, a fluid pressure developing pump driven by the engine, a second fluid pressure developing pump driven by an element of the torque transmitting connection which is operable only when the vehicle is moving, conduit means for connecting the pumps to the last named fluid motor whereby said fluid motor can be operated by fluid pressure developed by either pump and the valve means caused to be inoperative, and valve means controlled by the accelerator mechanism for preventing the fluid pressure developed by the engine driven pump from being effective in the second named fluid motor only when the accelerator mechanism is in released position.

11. In apparatus of the class described, a vehicle provided with a propelling engine having an accelerator mechanism, with a torque transmitting connection between the engine and the wheels and with a braking system including a source of fluid pressure, a brake actuating fluid motor and conduit means between said source and motor, valve means associated with the conduit means for holding the brakes applied, spring means for biasing the valve means to an open position, a solenoid connected to the holding valve means and when energized permitting said valve to close, an electrical circuit for said solenoid including a switch, a hydraulic pressure system including a pump driven by the engine, a second hydraulic pressure system including a pump driven by an element of the torque transmitting connection which is operable only when the vehicle is moving, a fluid motor for opening said switch, means for operating the fluid motor and opening said switch by fluid pressure developed by either pump, and valve means controlled by the accelerator mechanism and preventing hydraulic pressure developed by the engine driven pump from being effective in the fluid motor when said accelerator mechanism is in released position.

12. In apparatus of the class described, a vehicle provided with a propelling engine and with a torque transmitting connection between the engine and the wheels, a fluid pressure system including a fluid pressure generator driven by the engine, a second fluid pressure system including a fluid pressure generator driven by an element of the torque transmitting connection which is operable only when the vehicle is moving, a brake for the vehicle, means for controlling the brake by the fluid pressure developed by the generators, and control means associated with the engine driven generator for preventing the pressure developed thereby from being effective in controlling the brake.

13. In apparatus of the class described, a vehicle provided with a propelling engine having an accelerator mechanism and with a torque transmitting connection between the engine and the wheels, a fluid pressure system including a fluid pressure generator driven by the engine, a second fluid pressure system including a fluid pressure generator driven by an element of the torque transmitting connection which is operable only when the vehicle is moving, a brake for the vehicle, means for controlling the brake by the fluid pressure developed by the generators, and control means associated with the engine driven generator and operable when the accelerator mechanism is in released condition for preventing the pressure developed thereby from being effective in controlling the brake.

WALTER R. FREEMAN.